United States Patent
Horn et al.

(10) Patent No.: US 10,356,679 B2
(45) Date of Patent: Jul. 16, 2019

(54) HANDOVER USING DUAL ACTIVE CONNECTIONS

(71) Applicants: Gavin Bernard Horn, La Jolla, CA (US); Xipeng Zhu, Beijing (CN); QUALCOMM Incorporated, San Diego, CA (US)

(72) Inventors: Gavin Bernard Horn, La Jolla, CA (US); Xipeng Zhu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/524,141

(22) PCT Filed: Sep. 28, 2015

(86) PCT No.: PCT/CN2015/090906
§ 371 (c)(1),
(2) Date: May 3, 2017

(87) PCT Pub. No.: WO2016/095584
PCT Pub. Date: Jun. 23, 2016

(65) Prior Publication Data
US 2017/0332301 A1  Nov. 16, 2017

(30) Foreign Application Priority Data
Dec. 17, 2014 (WO) ............... PCT/CN2014/094029

(51) Int. Cl.
*H04W 36/14* (2009.01)
*H04W 36/18* (2009.01)
(Continued)

(52) U.S. Cl.
CPC ........... *H04W 36/18* (2013.01); *H04W 36/14* (2013.01); *H04W 76/15* (2018.02); *H04W 88/06* (2013.01)

(58) Field of Classification Search
CPC . H04W 36/18; H04W 72/0406; H04W 36/08; H04W 36/14; H04W 52/40; H04W 16/10; H04W 36/00; H04W 48/20
See application file for complete search history.

(56) References Cited

U.S. PATENT DOCUMENTS 7,899,495 B2    3/2011  Laroia et al.
2006/0039327 A1* 2/2006  Samuel ................ H04W 36/14
                                            370/331
(Continued)

FOREIGN PATENT DOCUMENTS

CN      1391407 A     1/2003
CN    101053181 A    10/2007
(Continued)

OTHER PUBLICATIONS

International Search Report and Written Opinion—PCT/CN2014/094029—ISA/EPO—dated Sep. 15, 2015.
(Continued)

*Primary Examiner* — Kwasi Karikari
(74) *Attorney, Agent, or Firm* — Loza & Loza, LLP

(57) ABSTRACT

A technique is disclosed to minimize service interruption at a wireless user equipment device during a handover by maintaining dual active connections during the handover. Upon initiating the handover, an initial/first connection with a first access node is maintained while establishing a second connection with a second access node. The user equipment device can receive data over the first connection and second connection during the handover. The first connection may be terminated (by the user equipment device or by timing out due to inactivity) after the handover is completed. Other aspects, embodiments, and features are also claimed and described.

22 Claims, 13 Drawing Sheets

(51) Int. Cl.
*H04W 76/15* (2018.01)
*H04W 88/06* (2009.01)

(56) References Cited

U.S. PATENT DOCUMENTS

| | | | |
|---|---|---|---|
| 2007/0225013 A1* | 9/2007 | Pflum | H04W 36/18 455/452.2 |
| 2008/0261601 A1 | 10/2008 | Kim et al. | |
| 2013/0322347 A1 | 12/2013 | Alex et al. | |

FOREIGN PATENT DOCUMENTS

| | | |
|---|---|---|
| CN | 101841880 A | 9/2010 |
| CN | 103944796 A | 7/2014 |
| EP | 2787763 A1 | 10/2014 |
| WO | WO-2006112561 A1 | 10/2006 |
| WO | WO-2006112562 A1 | 10/2006 |
| WO | WO-2007144757 A2 | 12/2007 |
| WO | 08008964 | 1/2008 |
| WO | 2014175665 A2 | 10/2014 |

OTHER PUBLICATIONS

International Search Report and Written Opinion—PCT/CN2015/090906—ISA/EPO—dated Dec. 28, 2015.
Supplementary European Search Report—EP15869095—Search Authority—Munich—dated May 4, 2018.

* cited by examiner

EXEMPLARY HANDOVER OF AN UE CONNECTED TO COMMON MME AND A COMMON SGW/PGW

*EXEMPLARY HANDOVER OF AN UE CONNECTED TO TWO RAN CONSTELLATIONS WITH MME RELOCATION AND A COMMON SGW/PGW*

HANDOVER USING DUAL ACTIVE CONNECTIONS

CROSS-REFERENCE TO RELATED APPLICATION(S)

This application is the U.S. national stage of PCT patent application number PCT/CN2015/090906 filed on Sep. 28, 2015 which is a continuation, and claims the priority and benefit, of PCT patent application number PCT/CN2014/094029 filed on Dec. 17, 2014. The disclosures of the foregoing applications are incorporated herein by reference in their entirety.

FIELD

Various features disclosed herein relate generally to cellular/wireless communication systems, and at least some features pertain more particularly to methods and devices for facilitating handovers of wireless services (e.g., cellular services) for mobile devices from one access point to another access point. Improvement of handoff procedures can enable and provide efficient use of power resources and aims to improve user experience.

INTRODUCTION

Mobile devices, such as mobile phones, wireless modems, tablets, or any other device with a processor that communicates with other devices through wireless signals are becoming increasingly popular and are used more frequently. Subscribers using such mobile devices in a cellular/wireless communication network are typically authenticated by the wireless communication network before being granted access to initiate and/or receive calls and transmit and/or receive data.

During use, mobile devices often move relative to access points such that handing off connections between access points is generally useful to maintain active network connection. Handovers typically involve disconnecting from a first access point prior to connecting to a second access point. During a handover time period, mobile devices cannot send data either over the first wireless connection (because the first wireless connection is terminated) nor over the second wireless connection (because the second wireless connection has not yet been established).

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various features facilitate a handover of a communication connection while minimizing service interruptions by using dual active connections at a user equipment device.

A first aspect provides a method operational on a user equipment device for facilitating a dual active handover. A first connection may be established with a first access node for communication services via a first network. An indication may be obtained that a handover to a second access node is to occur.

Obtaining an indication that the handover is to occur may include at least one of: (a) receiving a message or indicator from the first access node that the handover is to occur, and/or (b) obtaining an indication that the handover is to occur includes making an autonomous decision by the user equipment device to initiate the handover.

A second connection may then be established with a second access node for communication services, via the first network or a second network, while the first connection remains established. In various examples, the first connection and second connection may be wireless connections over a single radio access network or over different radio access networks. In another example, the first connection and second connection may be concurrently active during the handover. In yet another example, the first connection and second connection may be established by sharing a single receiver at the user equipment device. In an alternative implementation, the first connection may be established via a first receiver at the user equipment device and the second connection is established via a second receiver at the user equipment device.

When establishing the second connection, a new internet protocol (IP) address may be created for the user equipment device. Alternatively, a previous internet protocol (IP) address, used by the first connection, may be reused for the user equipment device for the second connection.

The first connection is terminated once the handover is completed. During handover, packets may be received over both the first connection and second connection. The user equipment may reorder the packets received and deletes duplicate packets received during handover. Also during handover and prior to terminating the first connection, the user equipment may transmitting packets over the second connection.

Prior to terminating the first connection, the user equipment device may receive handover completed indication from the first access node or second access node. In various examples, the handover completed indication may include at least one of: (a) an end marker indicating no more data to be transmitted; and/or (b) a radio resource control release from the first access node.

A second aspect provides a user equipment device, comprising: a wireless communication circuit coupled to a processing circuit. The wireless communication circuit may be configured to communicate with a first network. The processing circuit may be configured to: (a) establish a first connection with a first access node for communication services via a first network; (b) obtain an indication that a handover to a second access node is to occur; (c) establish a second connection with a second access node for communication services, via the first network or a second network, while the first connection remains established; and/or (d) terminate the first connection once the handover is completed.

A third aspect provides a method operational at a first access node for handing over communication services. A first connection may be established between the first access node and a user equipment device for communication services via a first network. A determination is then made to handover the communication services for the user equipment device to a second access node on a second network. The handover determination may be based, at least partially, on information obtained from the user equipment device related to a quality of the first connection. In another example, the handover determination may include receiving an indication that the handover is to occur from the user equipment device.

A handover request may be sent to initiate the handover. The first access node continues to receive packets intended for the user equipment device even after the handover has started. Those packets may be bicasted from the first access node to both the user equipment device and the second access node during the handover.

The first connection may be terminated once the handover is completed.

In one implementation, the first network and the second network may share a common serving gateway (SGW) and Packet Data Network (PDN) gateway (PGW). In another implementation, first network and the second network may each have a different serving gateway (SGW) and Packet Data Network (PDN) gateway (PGW).

Other aspects, features, and embodiments of the present described herein will become apparent to those of ordinary skill in the art, upon reviewing the following description of specific, exemplary embodiments of the present invention in conjunction with the accompanying figures. While features of the described herein may be discussed relative to certain embodiments and figures below, all embodiments may include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
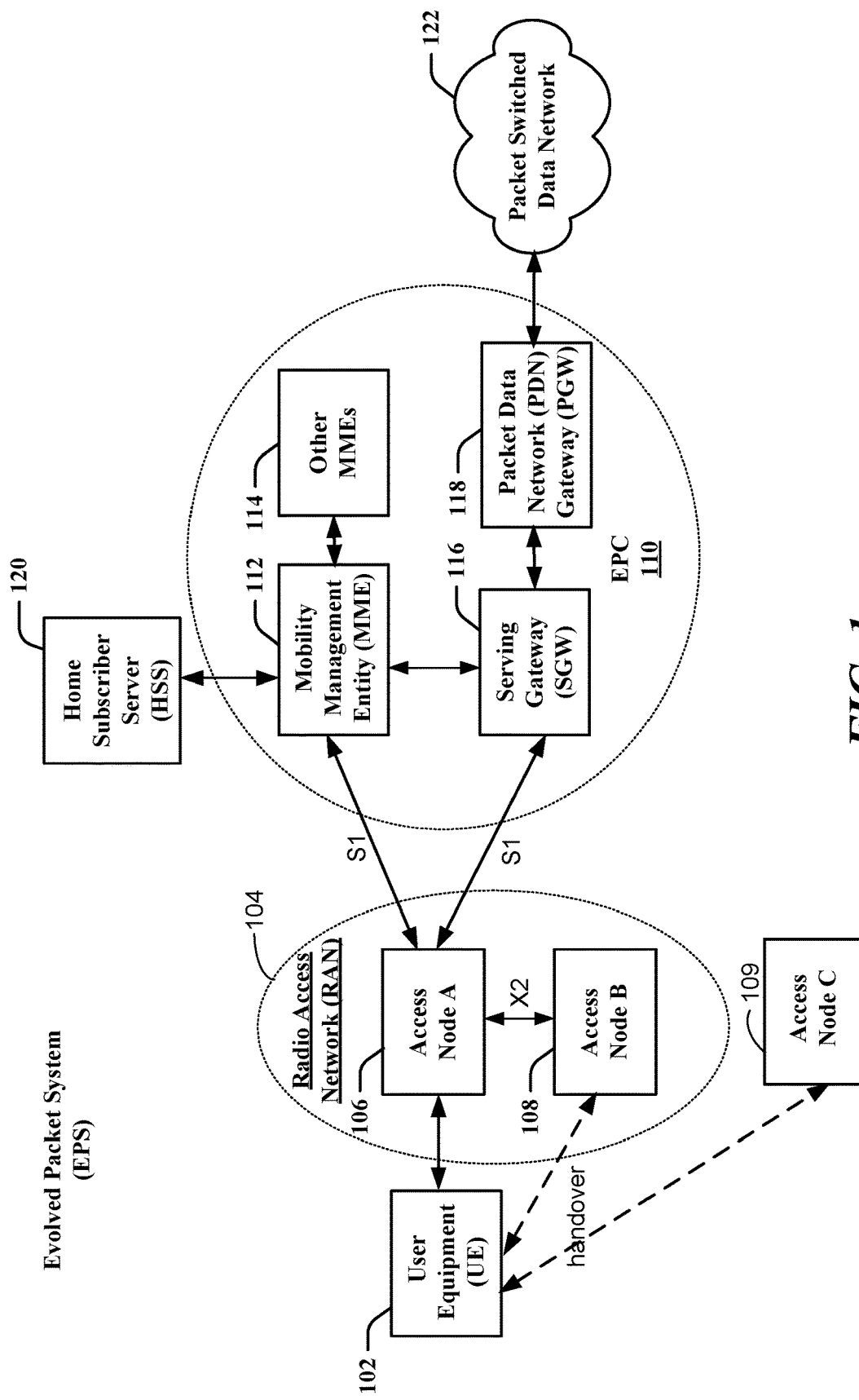
FIG. 1 is a diagram illustrating an exemplary next generation communication network architecture, such as an evolved packet system (EPS), according to some aspects/ embodiments.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The term "user equipment" (UE) as used herein is meant to be interpreted broadly. For example, a "user equipment" or "UE" may include a mobile phone, a cellular phone, a smart phone, a session initiation protocol (SIP) phone, a pager, a wireless modem, a personal digital assistant, a personal information manager (PIMs), personal media players, client devices, subscriber devices, tablet computers, laptop computers, a satellite radio, a global positioning system, a multimedia device, a video device, a digital audio player (e.g., MP3 player), a camera, a game console, a tablet, an entertainment device, a medical device, industrial equipment, actuator/sensor component, automotive component, metering equipment, IoE/IoT devices, and/ or other mobile communication/computing devices which communicate, at least partially, through a wireless or cellular network. The term "access node" is also meant to be interpreted broadly, and includes, for example, an evolved Node B (ENB), a base station, a base transceiver station, a radio base station, a radio transceiver, a basic service set (BSS), an extended service set (ESS), a network access point, and/or a network connectivity node that may be part of a radio access network and provides wireless network connectivity to one or more UEs.

Overview

There is a need for methods, apparatus, and/or systems that improve the handover procedure to reduce, minimize or eliminate the lack of data access by a mobile device (e.g., UE) during the handover period.

A technique is disclosed to minimize service interruption of a wireless user equipment device during a handover from one access node to another access node by maintaining dual active connections during the handover. Upon initiating the handover, an initial/first connection with a first access node is maintained while establishing a second connection with a second access node. The user equipment device can receive data over the first connection and second connection during the handover. The first connection may be terminated (by the user equipment device or by timing out due to inactivity) after the handover is completed.

Exemplary Network Operating Environment

FIG. 1 is a diagram illustrating an exemplary next generation communication network architecture, such as an evolved packet system (EPS) 100, according to some aspects/embodiments. The EPS 100 may include one or more user equipment (UE) 102, a Radio Access Network (RAN) 104 (e.g., Evolved Universal Mobile Telecommunication System (UMTS) Terrestrial Radio Access Network (E-UTRAN)), an Evolved Packet Core (EPC) 110, a Home Subscriber Server (HSS) 120, and a Packet Switched Network 122. As shown, the EPS 100 provides packet-switched services, however, as those skilled in the art will readily appreciate, the various concepts presented throughout this disclosure may be extended to networks providing circuit-switched services.

The RAN 104 may include one or more access nodes A 106 and B 108. Additionally, other access nodes C 109, coupled to other RANs and/or other MMEs may also serve to provide connectivity to the UE 102. As the UE 102 moves, its wireless connection service with the first node A 106 may be handed over to another access node B 108 and/or C 109 (e.g., within the same RAN or different RANs).

In one example, the first access node A 106 may be connected (or communicatively coupled) to the second access node B 108 via a backhaul interface X2. The first access node A 106 may serve as an access point to the EPC 110 for the UE 102.

The first access node 106 may be connected by an interface S1 to the EPC 110. The EPC 110 may include a Mobility Management Entity (MME) 112, other MMEs 114, a Serving Gateway (SOW) 116, and a Packet Data Network (PDN) Gateway 118. The MME 112 may be the control node that processes signaling between the UE 102 and the EPC 110. Generally, the MME 112 provides bearer and connection management. All user IP packets may be transferred through the Serving Gateway (SGW) 116, which itself is connected to the PDN Gateway 118. The PDN Gateway 118 may provide the UE internet protocol (IP) address allocation as well as other functions. The PDN Gateway 118 may be connected to the packet switched data network 122. The packet switched data network 122 may include the Internet, an intranet, an IP Multimedia Subsystem (IMS), and a PS Streaming Service (PSS).

The access nodes A 106 and B 108 typically communicate with each other via an "X2" interface. The access nodes A 106 and B 108 communicate with the EPC 110 (including the MME 112 and SGW 116) via an "S1" interface.

In existing wireless communication networks, such as a 4G network or Long Term Evolution (LTE) network, Non-Access Stratum (NAS) protocols form the highest stratum of the control plane between the user equipment (UE) 102 and the MME 112. NAS protocols support mobility of the UE 102 and the session management procedures to establish and maintain IP connectivity between the UE 102 and a PDN gateway 118.

In one example, the EPS 100 may utilize an EPS Session Management (ESM) protocol which provides procedures for the handling of EPS bearer contexts. Together with the bearer control provided by the Access Stratum, it provides the control of user plane bearers. The transmission of ESM messages is suspended during EMM procedures except for the attach procedure.

In one example, the EPS 100 may utilize an EPS Mobility Management (EMM) protocol which provides procedures for the control of mobility when the User Equipment (UE) uses the Evolved UMTS Terrestrial Radio Access Network (E-UTRAN). It also provides control of security for the NAS protocols.

In existing EPS systems, a UE is supported by a single MME at any one time. When a handover occurs across MME boundaries (i.e., from a first MME to a second MME), MME relocation of the UE is required. During this handover, the UE may be left without a data connection. For instance, as the UE switches from a first wireless connection with a first access node (coupled to a first MME) to a second wireless connection with a second access node (coupled to a second MME), there is a period of time in which the first wireless connection is terminated but the second wireless connection is not yet established.

In next generation networks and according to some aspects/embodiments, as the MME functionality is moved closer to the access nodes, the MME relocation procedures may occur much more frequently. Consequently, loss of connectivity for UE devices may become more noticeable. As described herein, a new procedure is disclosed to optimize handover performance by using dual active connections with different access nodes (e.g., served by different MMEs) to allow the UE to maintain a data connection during a handover.

As part of providing service to a UE, an MME context per link/connection is setup with an access node for each UE being served. Such MME context is setup between the MME and access node. An MME context may include both an EPS Mobility Management (EMM) context and one or more EPS Session Management (ESM) contexts associated with the UE. An MME context applies to one or more radio access technologies (RATs), e.g., a multi-access MME context including wireless local area network (WLAN) and LTE. The EMM context for a UE is authenticated for access at the network provisioning the credentials used by the UE for attachment (home or visited AAA for roaming), i.e., the access credentials. The access credential function serves to enable service to the UE to be established securely and there may not necessarily be a billing relationship between the access credential provider and the serving network. One or more ESM contexts, where each ESM context is associated with one or more APNs, may be used to host the ESM (session management) functions for each service.

some implementations may use more than one MME context simultaneously on a single connection to an access node. The access node may merge or reconcile the two MME contexts for a UE at the RAN and figure out mobility, conflicts, etc., between the two MME contexts. As part of establishing a connection between a UE and access node, a single UE context is typically defined at the access node for the UE, One MME context implies only one identifier, e.g., global unique temporary identifier (GUTI), for the UE context at an access node.

A UE may have multiple MME contexts active simultaneously when it has multiple links/connections active simultaneously. For example, the UE may be connected over two links to separate access nodes that are not served by the same MME.

While FIG. I illustrates an exemplary network in which one or more aspects and features may be implemented, these features may also be implemented on various types of networks, including subscriber networks, public data network (PDN) networks, wireless networks, etc.

First Exemplary Handover Using Dual Active Connections

Figure 2:
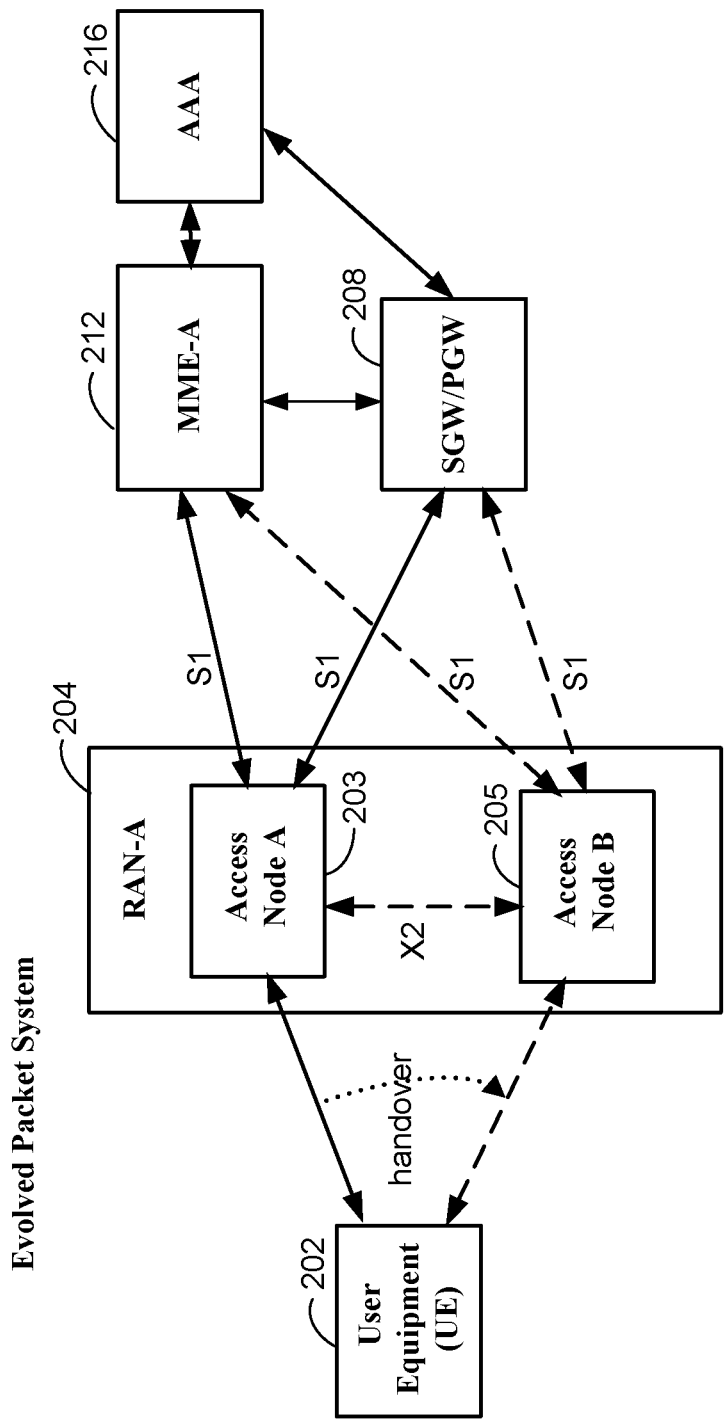
FIG. 2 is a block diagram illustrating a first example of a handover using dual active connections within a single radio access network with a common mobility management entity (MME) and using a common serving gateway (SGW) and PDN gateway (PGW) according to some aspects/embodiments.

FIG. 2 is a block diagram illustrating a first example of a handover using dual active connections within a single radio access network (RAN-.A) 204 with a common mobility management entity (MME) 212 and using a common serving gateway (SGW) and PDN gateway (PGW) 208 according to some aspects/embodiments. In this example, a single authentication, authorization, and accounting (AAA) server 216 is used by the UE device 202 (i.e., one subscription is used by the UE device 202). The UE device 202 may include a transceiver circuit capable of receiving from two different connections, such as two separate receiver circuits or a single receiver circuit that can be shared (e.g., using multiplexing or timeslots) to receive from (and transmit to) two distinct connections. In this example, a handover of the UE device 202 occurs from a first connection via a first access node A 203 and to a second connection via a second access node B 205 while utilizing an X2 interface between the first access node A 203 and second access node B 205.

Figure 3:
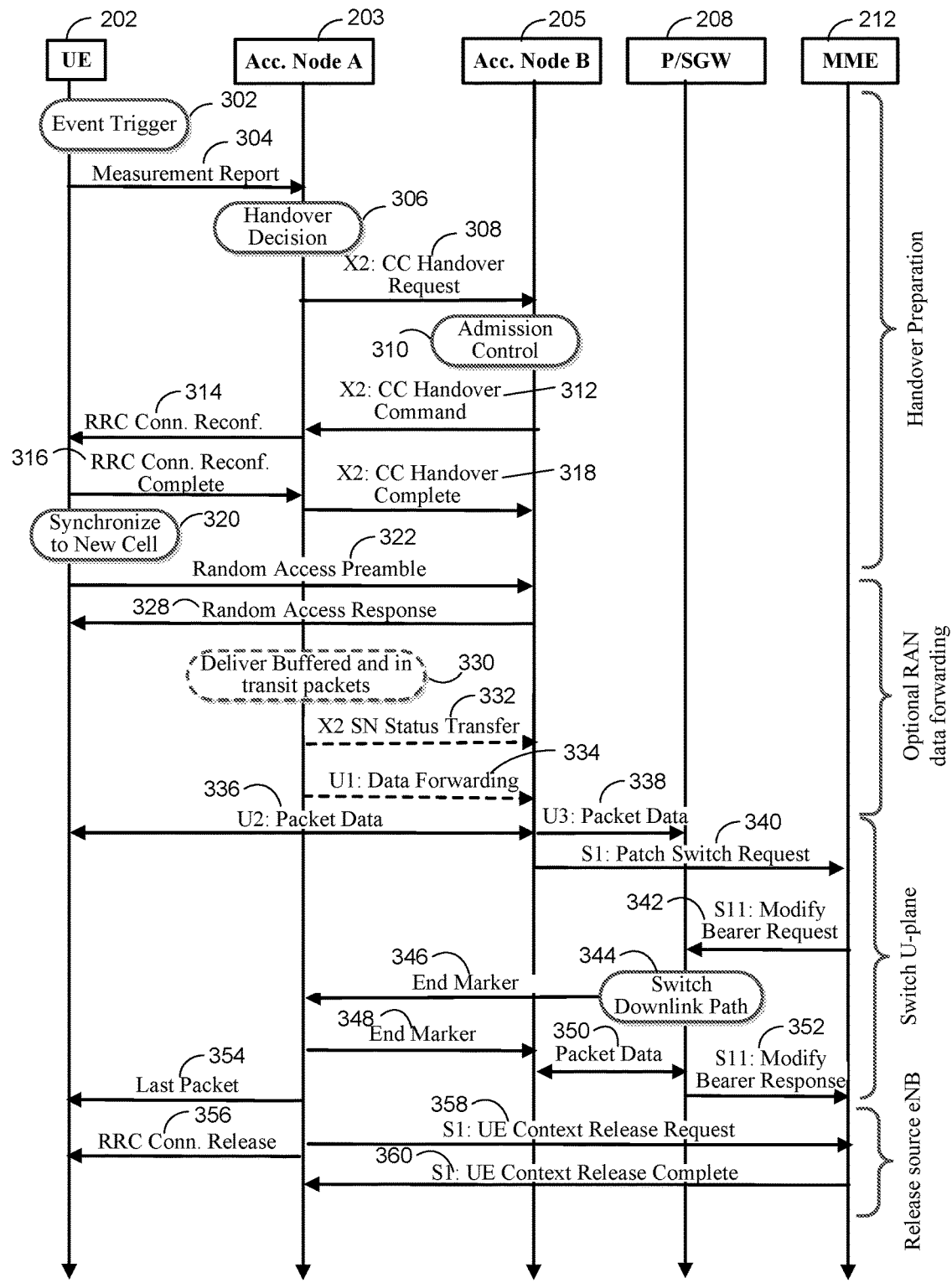
FIG. 3 is a flow diagram illustrating one example of how a handover using the X2 interface between access nodes may be implemented using dual active connections for a UE within the network environment of FIG. 2 according to some aspects/embodiments.

FIG. 3 is a flow diagram illustrating one example of how a handover using the X2 interface between access nodes may he implemented using dual active connections for a UE device within the network environment of FIG. 2 according to some aspects/embodiments. The UE device 202 may have previously established a first connection or link (e.g., a radio bearer) with the serving first access node A 203. The UE device 202 may be configured for a dual active connection handover. Upon the occurrence of a triggering event 302 (e.g., receipt of other access node pilot/advertisement, periodic scanning for new access nodes, request from currently serving access node, etc.), the UE device 202 may provide a measurement report 304 (e.g., signal strength measurement, error packet count, etc.) to a currently serving access node A 203. The serving access node A 203 may make a decision 306 (e.g., based on the measurement report 304) on whether a handover is appropriate. If the access node A 203 decides to initiate a handover of connectivity service for the UE device 202 to a different second access node B 205, a handover request 308 is sent to the second access node B 205 which decides on accepting the request (e.g., as part of admission control 310). If the second access node B 205 determines to accept the handover request 308, it may send a handover command 312 to the first access node A 203. Upon receipt of the handover command 312, the first access node A 203 may send a connection reconfiguration request 314 to the UE device 202. In response, the LIE device 202 may send a connection reconfiguration complete message 316 to the first access node A 203, indicating that the UE device 202 shall start the handover to the second access node B 205. The first access node A 203 may then send a handover complete message 318 to the second access node B 205.

Upon performing a synchronization with the new cell 320 (e.g., the cell for the second access node B 205) the UE device 202 may establish a second connection (with the second access node B 205) by sending a random access preamble 322 to the second access node B 205 and, in reply, receiving a random access response 328. At this point, the UE device 202 may have two concurrent connections, i.e., the first connection with the first access node A 203 and the second connection with the second access node B 205.

During this handover stage, the first access node A 203 may buffer packets to the UE device 202 and delivers in-transit packets 330 to the second access node B 205. For instance, the first access node A 203 may send an status transfer message 332 (e.g., to indicate packets for the UE device 202 are being forwarded) to the second access node B 205 and then a data forwarding message 334 including the in-transit packets intended for the UE device 202. That is, the packets arriving at the first access node A 203 for the UE device 202 during the handover procedure may be forwarded to the second access node B 205 which can then deliver them to the UE device 202. Consequently, the second access node B 205 may send downlink data packets 336 to the UE device 202 while the UE device 202 may send uplink data packets 336 to the second access node B 205, which then forwards 338 them to the PGW/SGW 208.

Note that during this handover, the forwarding of in-transit packets may be in addition to the first access node A 203 sending the packets directly to the UE device 202. The UE device 202 may simply discard any duplicate packets received (e.g., packet identifiers may be used to compare packets received from the first access node A 203 and the second access node B 205 and discard duplicate packets).

The second access node B 205 may initiate a user plane switch (e.g., downlink path for the UE device 202) by sending a switch request 340 to the MME 212. This notifies the MME 212 that packets to the UE device 202 should be forwarded to the second access node B 205 instead of the first access node A 203.

In turn, the MME 212 may send a modify bearer request 342 to the PGW/SGW 208. This causes the PGW/SGW 208 to switch the downlink path 344 for the UE device 202 and send an end marker 346 to the first access node A 203. The first access node A 203 may forward this end marker 348 to the second access node B 205 to indicate that the second access node B 205 should takeover downlink communications for the UE device 202. Consequently, the second access node B 205 may transmit both uplink and downlink packet data 350 for the UE device 202. The PGW/SGW 208 may also send a modify bearer response 352 to indicate that the bearer for the UE device 202 has been successfully updated.

After the last buffered packet 354 has been forwarded by the first access node A 203 to the UE device 202, the first access node A 203 may send a connection release message 356 to the UE device 202 to terminate the first connection. Additionally, the first access node A 203 may send a UE context release request 358 to the MME 212 and receives a UE context release complete 360 in response. Then, the second access node B 205 becomes the only serving node and the dual active handover is completed.

In traditional single active handover, the user plane is disconnected between the connection reconfiguration complete message 316 and the packet data messaging 336. However, in dual active handover, the interruption can be avoided by having the first access node A 203 bi-casting cached downlink packet data to the UE device 202 and the second access node B 205. The second access node B 205 forwards the received packet data to the UE device 202. The UE device 202, due to its dual active capabilities, is able detect and dispose of duplicate packets that may be received.

If an X2 interface is not available between the first access node A 203 and the second access node B 205, the handover can be performed via an S1 interface.

Figure 4:
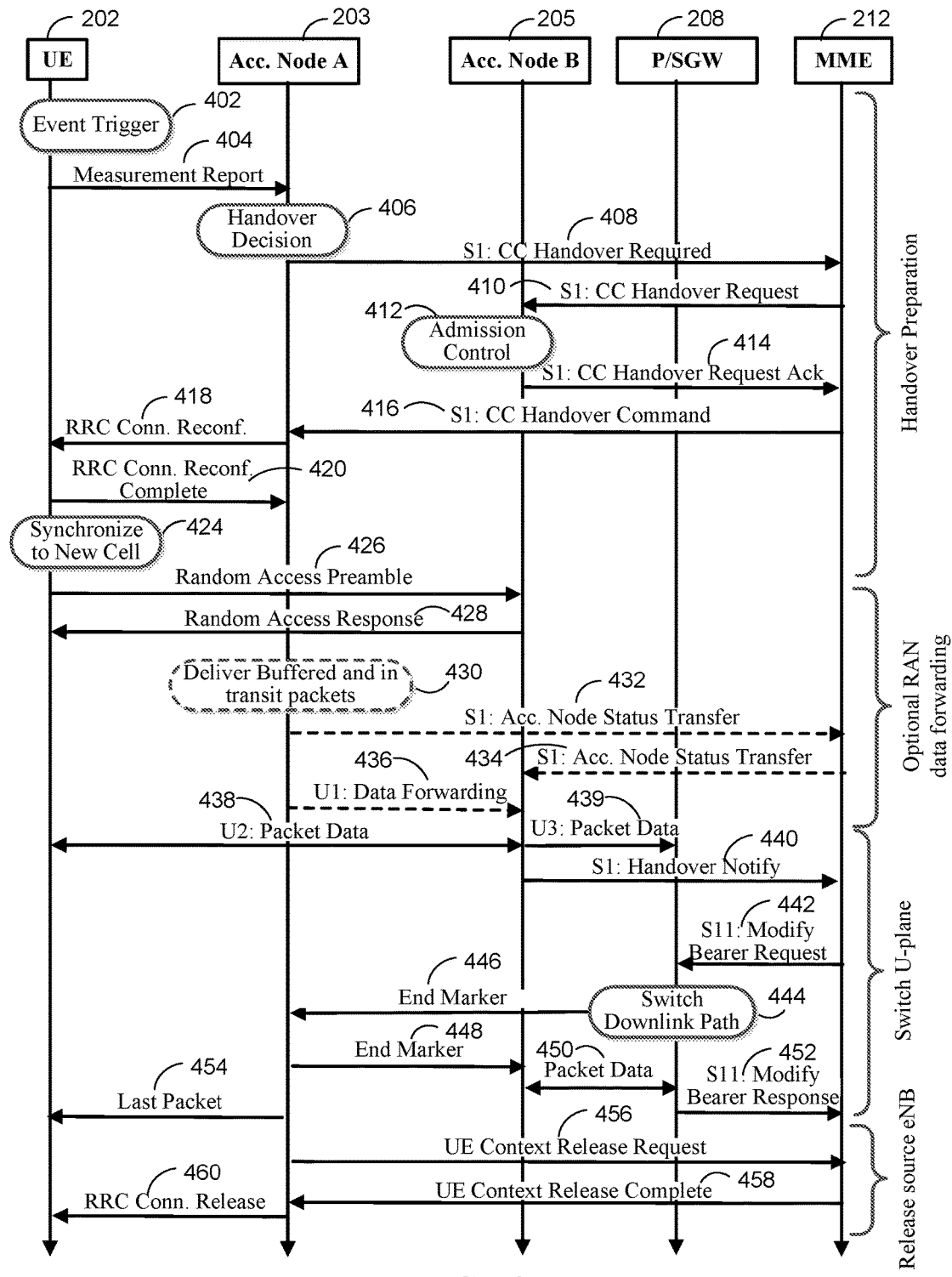
FIG. 4 is a flow diagram illustrating one example of how a handover using the S1 interface between access nodes and the MME and SGW/PGW may be implemented using dual active connections for a UE within the network environment of FIG. 2 according to some aspects/embodiments.

FIG. 4 is a flow diagram illustrating one example of how a handover using an S1 interface between access nodes and an MME and SGW/PGW may be implemented using dual active connections for a UE device within the network environment of FIG. 2 according to some aspects/embodiments. The UE device 202 may have previously established a first connection with the serving first access node A 203. The UE device 202 may be configured for a dual active connection handover. Upon the occurrence of a triggering event 402 (e.g., receipt of other access node pilot/advertisement, periodic scanning for new access nodes, request from currently serving access node, etc.), the UE device 202 may provide a measurement report 404 (e.g., signal strength measurement, error packet count, etc.) to a currently serving access node A 203. The serving access node A 203 may make a decision 406 (e.g., based on the measurement report 404) on whether a handover is appropriate. If the access node A 203 decides to initiate a handover of connectivity service for the UE device 202 to a different second access node B 205, a handover required message 408 is sent to the MME 212. The MME 212 may then send a handover request message 410 to the second access node B 205. Upon receipt of the handover request 410, the second access node B 205 may perform admission control 412 which may result in a handover request acknowledge 414 being sent to the MME 212. If so, the MME 212 may send a handover command 416 to the first access node A 203.

Upon receipt of the handover command 416, the first access node A 203 may send a connection reconfiguration request 418 to the UE device 202. In response, the UE device 202 may send a connection reconfiguration complete message 420 to the first access node A 203, indicating that the UE device 202 shall start the handover to the second access node B 205.

Upon performing a synchronization with the new cell 424 (e.g., the cell for the second access node B 205) the UE device 202 may establish a second connection (with the second access node B 205) by sending a random access preamble 426 to the second access node B 205 and, in reply, receiving a random access response 428. At this point, the LIE device 202 may have two concurrent connections, i.e., the first connection with the first access node A 203 and the second connection with the second access node B 205.

During this handover stage, the first access node A 203 may buffer packets to the UE device 202 and delivers in-transit packets 430 to the second access node B 205. For instance, the first access node A 203 may send an access node status transfer message 432 (e.g., to indicate packets for the UE device 202 are being forwarded) to the MME 212. In turn, the MME 212 may send an access node status transfer message 434 to the second access node B 205. The first access node A 203 may forward data packets 436, including the in-transit packets intended for the UE device 202, to the second access node B 205. That is, the packets arriving at the first access node A 203 for the UE device 202 during the handover procedure may be forwarded to the second access node B 205 which can then deliver them to the UE device 202. Consequently, the second access node B 205 may send downlink data packets 438 to the UE device 202 while the UE device 202 may send uplink data packets 438 to the second access node B 205, which then forwards 339 them to the PGW/SGW 208.

Note that during this handover, the forwarding of in-transit packets may be in addition to the first access node A 203 sending the packets directly to the UE device 202. The UE device 202 may simply discard any duplicate packets received (e.g., packet identifiers may be used to compare packets received from the first access node A 203 and the second access node B 205 and discard duplicate packets).

The second access node B 205 may send a handover notify message 440 to the MME 212. This may indicate to the MME 212 that packets to the UE device 202 should be forwarded to the second access node B 205 instead of the first access node A 203.

In turn, the MME 212 may send a modify bearer request 442 to the PGW/SGW 208. This causes the PGW/SGW 208 to switch the downlink path 444 for the UE device 202 and send an end marker 446 to the first access node A 203. The first access node A 203 may forward this end marker 448 to the second access node B 205 to indicate that the second access node B 205 should takeover downlink communications for the UE device 202. Consequently, the second access node B 205 may transmit both uplink and downlink packet data 450 for the UE device 202. The PGW/SGW 208 may also send a modify bearer response 452 to indicate that the bearer for the UE device 202 has been successfully updated.

After the last buffered packet 454 has been forwarded by the first access node A 203 to the UE device 202, the first access node A 203 may send a UE context release request 456 to the MME 212. In response, the first access node 203 may receive a UE context release complete 458 from the MME 212. The first access node A 203 may then send a connection release message 460 to the UE device 202 to terminate the first connection. Then, the second access node B 205 becomes the only serving node and the dual active handover is completed.

Second Exemplary Handover Using Dual Active Connections

Figure 5:
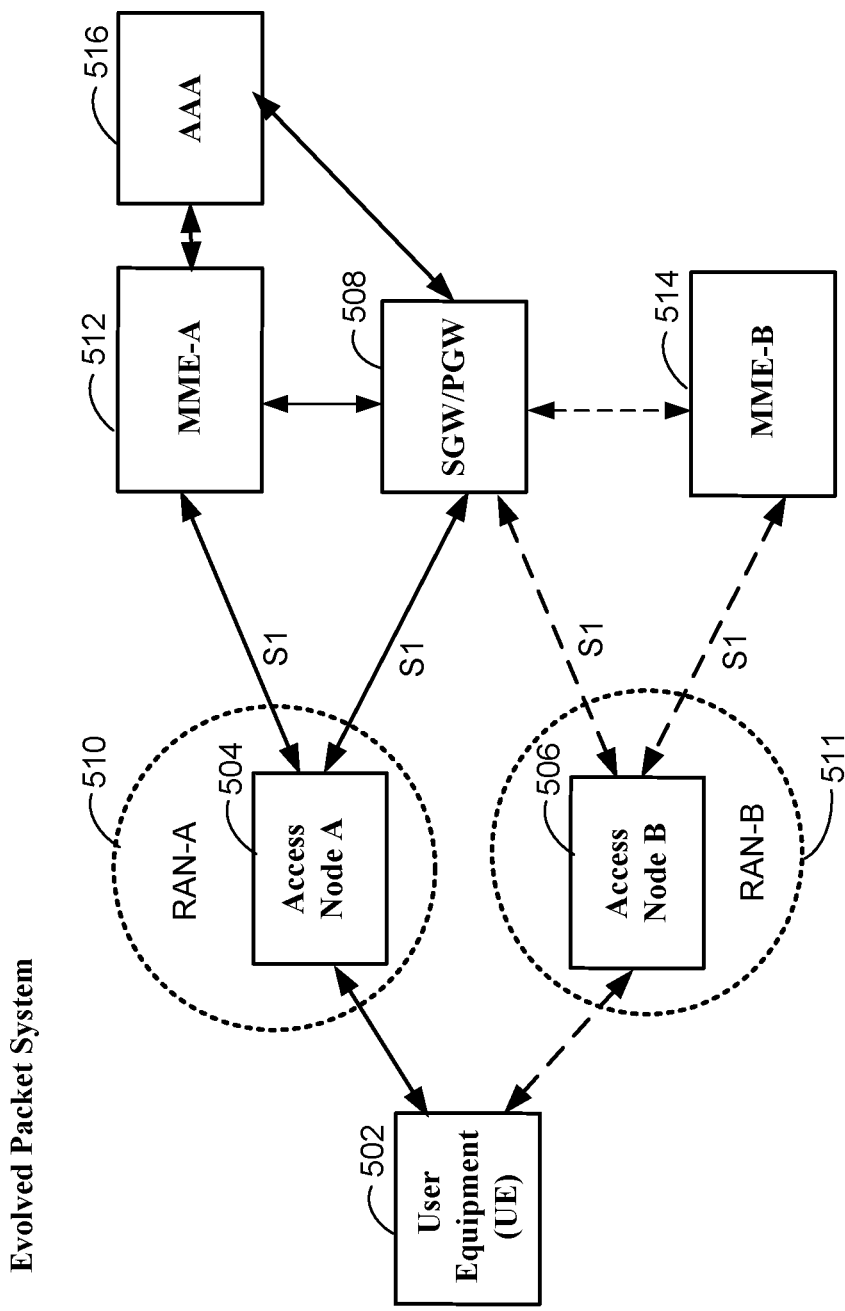
FIG. 5 is a block diagram illustrating a second example of a handover using dual active connections across RAN constellations with mobility management entity (MME) relocation and using a common serving gateway (SGW) and PDN gateway (PGW) according to some aspects/embodiments.

FIG. 5 is a block diagram illustrating a second example of a handover using dual active connections across RAN constellations 504 and 506 with mobility management entity (MME) relocation and using a common serving gateway (SGW) and PDN gateway (PGW) 508 according to some aspects/embodiments. In this example, a single authentication, authorization, and accounting (AAA) server 516 is used by a UE 502 (i.e., one subscription is used by the UE 502). However, the handover occurs from a first access node A 504 in a first radio access network (RAN-A) 510 to a second access node B 506 in a second radio access network (RAN-B) 511. The first RAN-A 510 may have a corresponding first MME-A 512 while the second RAN-B 511 may have a corresponding second MME-B 514. A common SGW/PGW gateway 508 is shared by the first RAN-A 510 and second RAN-B 511. The UE 502 may include a transceiver circuit capable of receiving from two different connections, such as two separate receiver circuits or a single receiver circuit that can be shared (e.g., using timeslots) to receive from (and transmit to) two distinct connections. In this example, a handover of the UE device 502 occurs from a first connection via the first access node 504 and to a second connection via the second access node 506.

Figure 6A:
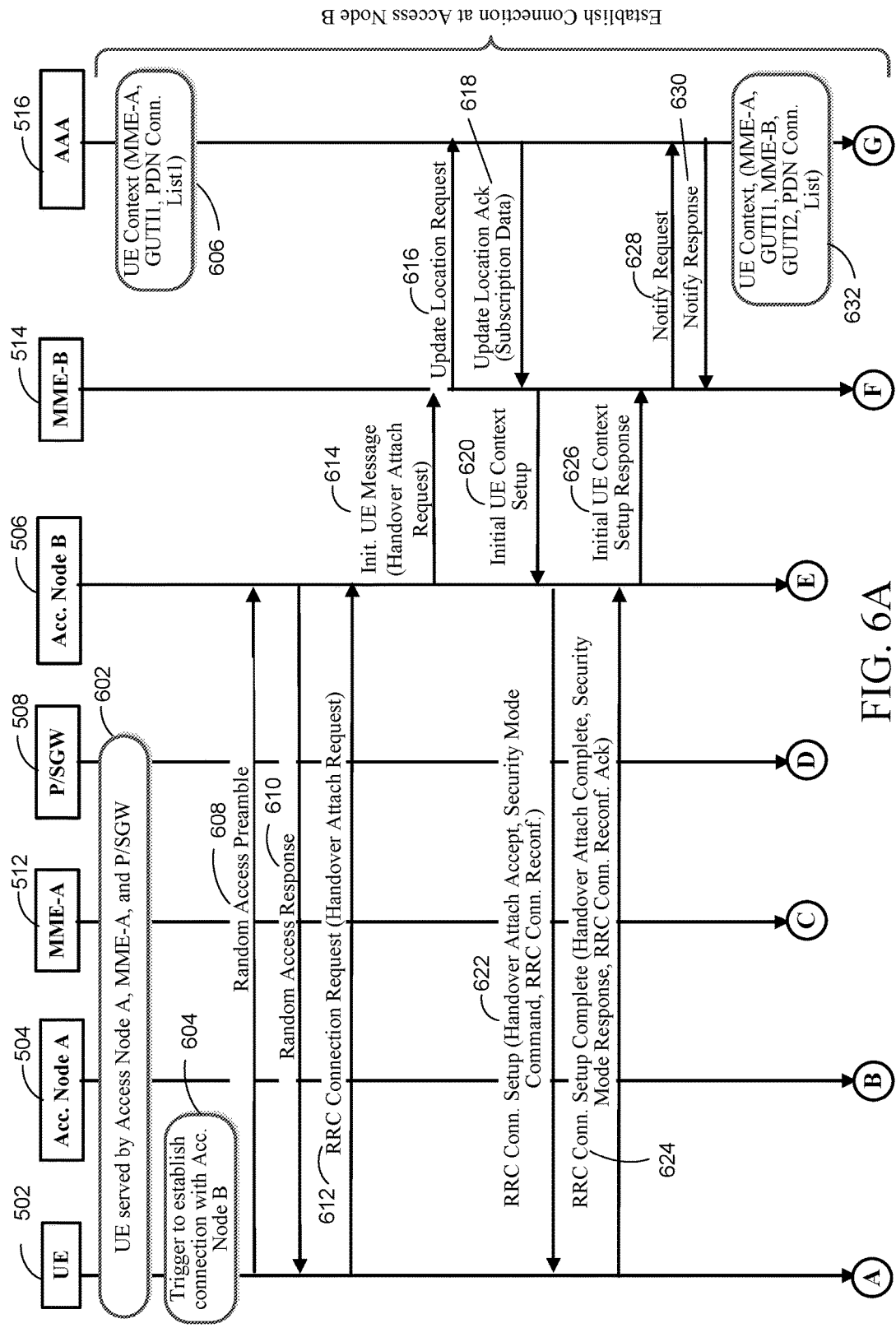
FIG. 6 (comprising FIGS. 6A and 6B) is a flow diagram illustrating one example of how a handover between access nodes on different RANs with MME relocation and a common SGW/PGW may be implemented using dual active connections for a UE within the network environment of FIG. 5 according to some aspects/embodiments.
Figure 6B:
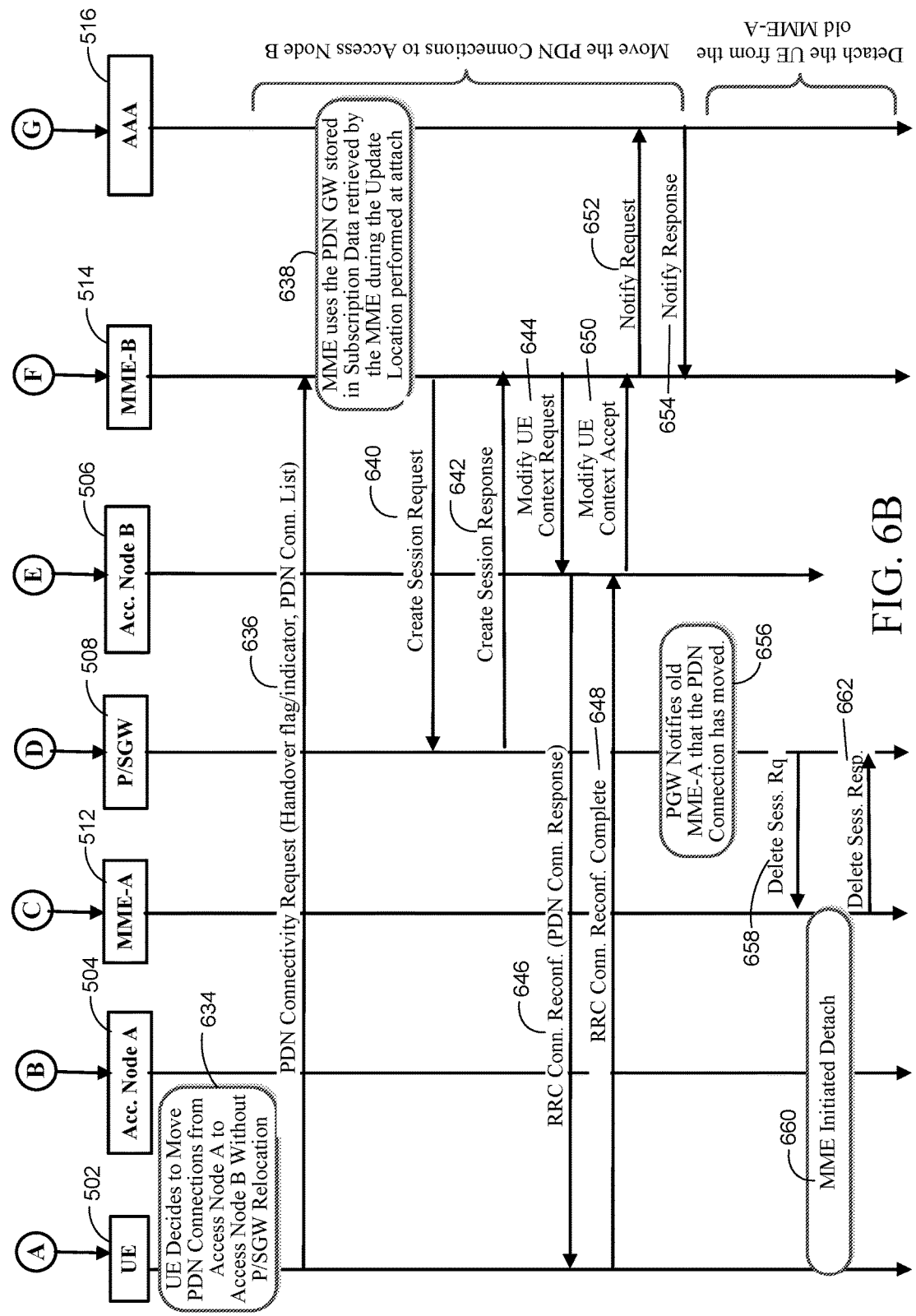

FIG. 6 (comprising FIGS. 6A and 6B) is a flow diagram illustrating one example of how a handover between access nodes on different RANs with MME relocation and a common SGW/PGW may be implemented using dual active connections for a UE device within the network environment of FIG. 5 according to some aspects/embodiments. The UE device 502 may have previously established service 602 with the first access node A 504, first MME-A 512, and PGW/SGW 508. This may include establishing/obtaining a first connection with the serving first access node A 504 while using a first MME-A 512 and the SGW/PGW 508 while having a first UE context 606 at the AAA 516. A dual active connection handover may be triggered 604 autonomously by a UE device decision, or the network may indicate (e.g., in an RRC message for the UE device 502) to establish a new connection (e.g., in a CC Handover command with no context).

Upon occurrence of this triggering event 604, the UE 502 establishes a second connection with the second access node B 506 by sending a random access preamble 608 to the second access node B 506 and, in reply, receiving a random access response 610. If UE device 502 does not need IP address continuity, the UE device 502 may establish a new PDN connection with the second access node B 506. The UE device 502 may send a handover attachment request 612 to the second access node B 506. The second access node B 506 sends an initial UE message 614 (including the handover attachment request 612) to the second MME-B 514 (e.g., the MME serving the second access node B 506). Upon receipt of the initial LIE message 614, the second MME-B 514 sends an update location request 616 to the AAA 516 and receives an update location acknowledgement 618 from the AAA 516, Which includes subscription data for the UE device's second connection. The second MME-B 514 then sends an initial UE context setup 620 to the second access node B 506. The second access node B 506 then sends a connection setup command 622 to the UE device 502 and, in reply, receives a connection setup complete command 624 from the UE device 502. The second access node B 506 then sends an initial UE context setup response to the second MME-B 514. The second MME-B 514 then sends a notify request 628 to the AAA 516 and receives a notify response 630. At this point the AAA 516 updates the UE context 632 for the UE device 502 so that it includes the second MME-B and a GUTI2. Meanwhile, the first connection with the first access node A 504 remains active and operational.

If the UE device 502 decides to move 634 its connection to the second access node B 506 without PGW/SGW relocation (e.g., it needs IP address continuity), the UE device 502 may send a handover connectivity request 636 to the second MME-B 514 to transfer its connection to the second access node B 506 via the second MME-B 514. The second MME-B 514 uses in the PGW stored in the subscription data retrieved by the second MME-B 514 to create a session request 640 that is sent to the PGW/SGW 508. The PGW-SGW sends a session response 642 to the second MME-B 514. In turn, the second MME-B 514 sends a modify UE context request 644 to the second access node B 506. This causes the second access node B 506 to send a connection reconfiguration message 646 (which includes or acts as a connection response) to the UE device 502. The UE device 502 sends a connection reconfiguration complete message 648 to the second access node B 506 which causes the second access node B 506 to send a modify UE context accept message 650 to the second MME-B 514. The second MME-B 514 sends a notify request 652 to the AAA 516 and receives a notify response 654 in reply.

For the first connection with the first access node A 504, the PGW 508 initiates bearer deactivation procedure to release the PDN connection. The PGW/SGW 508 notifies the first MME-A that the connection has moved 656. This may include sending a delete session request 658 to the first MM-A 512. If there are no remaining PDN connections to the UE device 502, the first MME-A 512 performs a detach procedure 660 with the UE 502 and releases the first connection with the first access node A 504. The first MME-A 512 then sends a delete session response message 662 to the PGW/SGW 508.

To perform the correct handover procedure, the UE device 502 needs to know whether the second access node 506 belongs to a different RAN constellation than the first access node A 504. Where network triggered dual active handover is implemented, an rRRC Connection Reconfiguration can include RAN information in the handover command, e.g., a flag indicating the handover is to a different RAN constellation. Where a UE triggered dual active handover is implemented, the UE device 502 can use a network identifier to determine that the handover is to a different RAN constellation, e.g., PLMN ID, TAC, or a new identifier such as a constellation identifier may be used to distinguish between RANs.

Third Exemplary Handover Using Dual Active Connections

Figure 7:
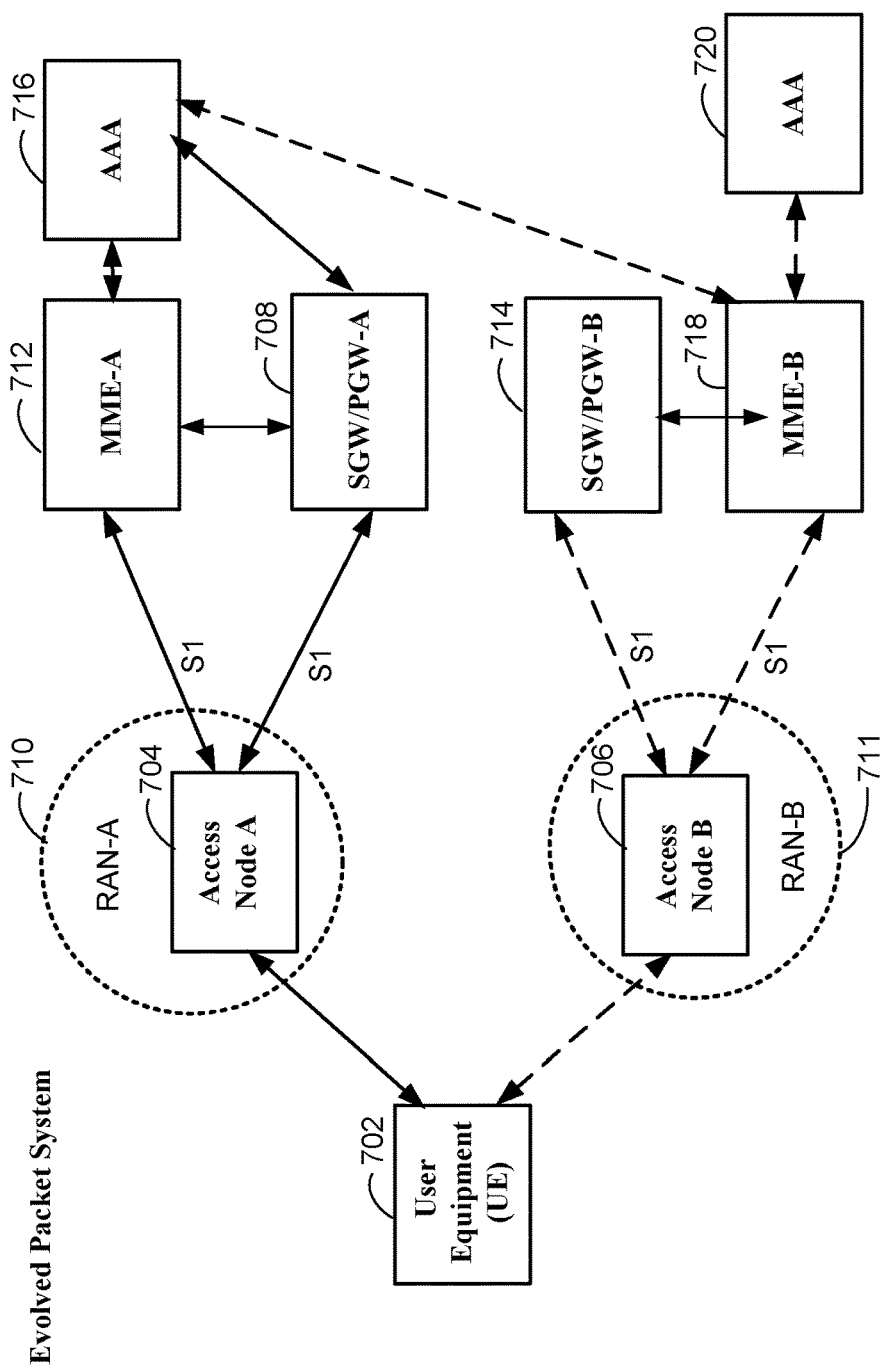
FIG. 7 is a block diagram illustrating a third example of a handover using dual active connections across RAN constellations with mobility management entity (MME) relocation and using a separate serving gateways (SGW) and PUN gateways (POW) according to some aspects/embodiments.

FIG. 7 is a block diagram illustrating a third example of a handover using dual active connections across a plurality of RAN constellations 704 and 706 with mobility management entity (MME) relocation and using separate serving gateways (SGW) and PDN gateways (PGW) 708 and 714 according to some aspects/embodiments. In this example, a first authentication, authorization, and accounting (AAA) server 716 is used by a UE 702 (i.e., a first subscription is used by the UE 702) to obtain service via a first connection established with a first access node A 704 in a first RAN-A 710 using a first MME-A 712 and first SGW/PGW-A 708. A handover may occur to a second access node B 706 in a second RAN-B 711 using a second MME-B 718 and a second SGW/PGW-A 718.

As the UE 702 moves between the two RAN constellations 710 and 711 (either for handover or due to multi-connectivity), a new context is established in the second MME-B 718. In the case of handover, after the handover is completed, the first MME-A 712 may remove its context associated with the UE 702.

In the case of separate GWs 708 and 714, e.g., due to SIPTO within an operator, or inter-operator multi-connectivity and offload, the UE establishes a new IP address at the target RAN constellation.

In the case of inter-operator multi-connectivity, the UE 70 may use separate subscriptions on each operator or it may be roaming.

Figure 8:
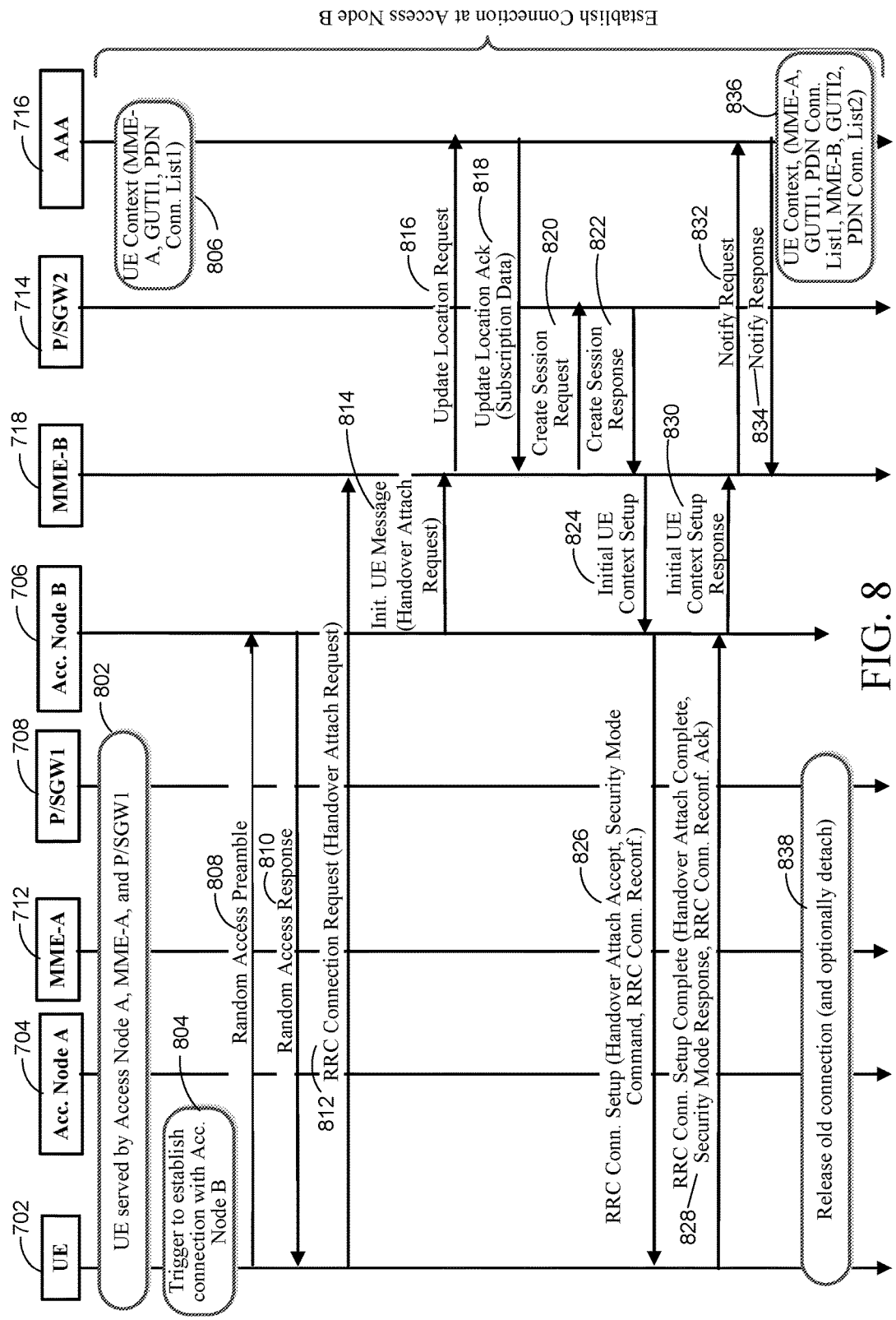
FIG. 8 is a flow diagram illustrating one example of how a handover between access nodes on different RANs with MME relocation and separate SGW/PGWs may be implemented using dual active connections for a LIE within the network environment of FIG. 7 according to some aspects/ embodiments.

FIG. 8 is a flow diagram illustrating one example of how a handover between access nodes on different RANs with MME relocation and separate SGW/PGWs may be implemented using dual active connections for a LIE within the network environment of FIG. 7 according to some aspects/embodiments. The UE device 702 may have previously established service 802 with the first access node A 704, first MME-A 712, and PGW/SGW 708. This may include establishing/obtaining a first connection with the serving first access node A 704 while using a first MME-A 712 and the SGW/PGW 708 and having a first UE context 806 at the AAA 716. A dual active connection handover may be triggered 804 autonomously by a UE device decision, or the network may indicate (e.g., in an RRC message for the UE device 502) to establish a new connection (e.g., in a CC Handover command with no context).

Upon occurrence of this triggering event 804, the UE device 702 establishes a second connection with the second access node B 706 by sending a random access preamble 808 to the second access node B 706 and, in reply, receiving a random access response 810. If UE device 702 does not need IP address continuity, the UE device 702 may establish a new PDN connection with the second access node B 706. The UE device 702 may send a handover connection request 812 to the second MME-B 718. The second access node B 706 also sends an initial UE message 814 (including the handover attachment request 812) to the second MME-B 818 (e.g., the MME serving the second access node B 706). Upon receipt of the initial UE message 814, the second MME-B 514 sends an update location request 816 to the AAA 716 and receives an update location acknowledgement 818 from the AAA 516, which includes subscription data for the UE device's second connection. The second MME-B 718 then sends a create session request 820 to the second PGW/SGW 714 and receives, in reply, a create session response 822. The second MME-B 718 then sends an initial LE context setup message 824 to the second access node B 706. The second access node B 706 sends a connection setup command 826 to the UE device 702. in response, the UE device 702 sends a connection setup complete message 828 to the second access node B 706. The second access node B 706 may then send an initial UE context setup response 830 to the second MME-B 718.

The second MME-B 718 then sends a notify request 832 to the AAA 716 and receives a notify response 834. At this point the AAA 716 updates the UE context 836 for the UE device 702 so that it includes the second MME-B and a GUTI2. Meanwhile, the first connection with the first access node A 704 remains active and operational up to this point. The network may release the first connection 838 from the first access node 704, e.g., the UE device 702 may deactivate the PDN connections with first MME-A 712, or the network may release the first connection due to lack of activity.

Note that, if the UE device 702 needs IP address continuity, the UE device 702 may perform the procedure illustrated in FIG. 6B.

Exemplary User Equipment (UE) Device and Method Operational Therein

Figure 9:
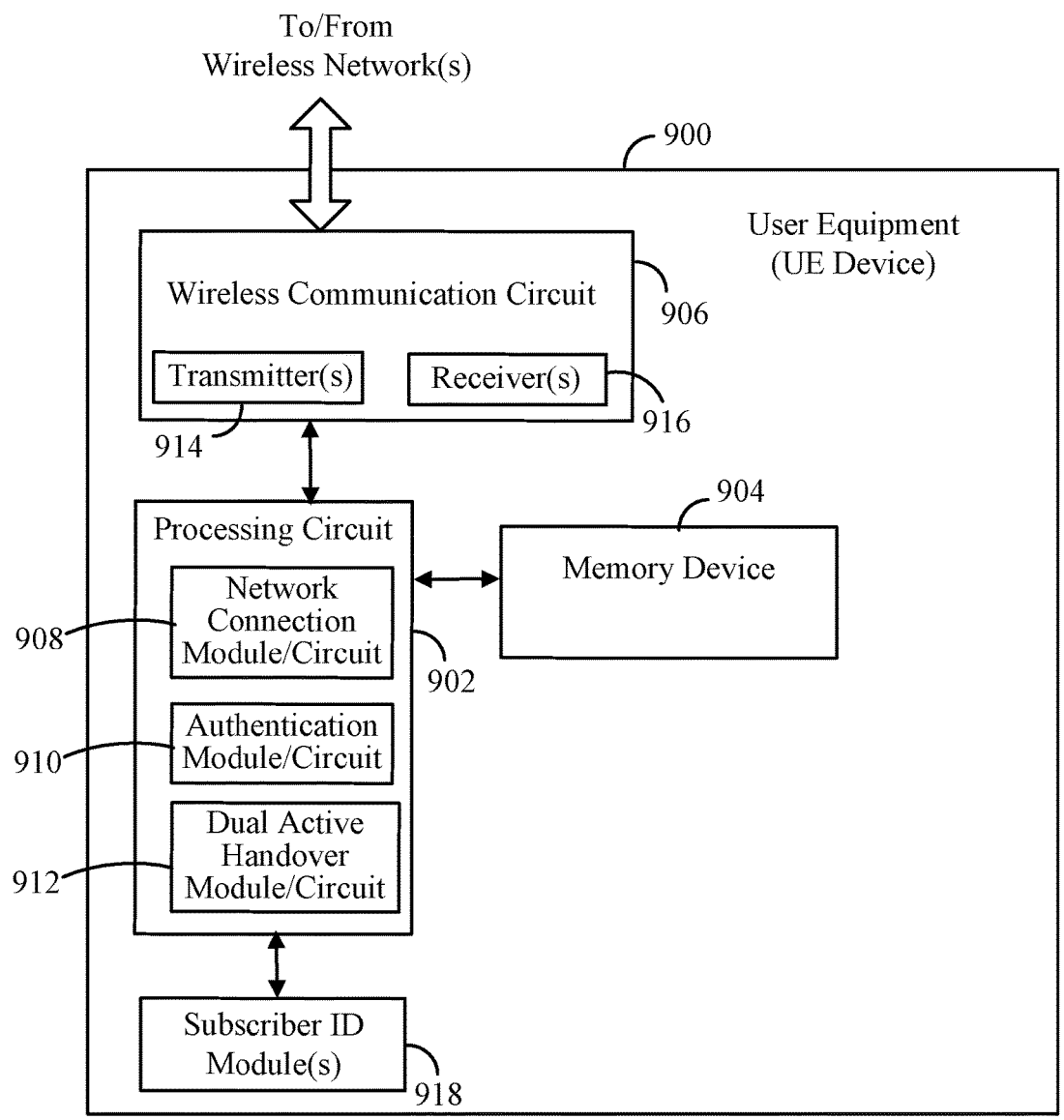
FIG. 9 illustrates a functional block diagram of at least one embodiment of a user equipment (UE) device with dual active connection capabilities according to some aspects/ embodiments.

FIG. 9 illustrates a functional block diagram of at least one embodiment of a user equipment (UE) device 900 with dual active connection capabilities. The UE device 900 may generally include a processing circuit 902 (e.g., processor, processing module, etc.) coupled to a memory device 904 (e.g., memory module, memory, etc.), one or more subscriber identity (ID) module(s) 918, and/or and a wireless communication circuit 906 according to some aspects/embodiments.

The processing circuit 902 may be configured to establish a wireless connection via the wireless communication circuit 906 to send and/or receive information from a network (e.g., from an access node). The processing circuit 902 may be coupled to the memory circuit 904 such that the processing circuit 902 can read information from, and write information to, the memory device 904. The processing circuit 902 may also include a network connection module/circuit 908 for establishing a network connection (via the wireless communication circuit 906) with one or more access nodes. The processing circuit 902 may also include a device authentication module/circuit 910 for performing the various steps of authenticating the user equipment 900 with a network. The processing circuit 902 may also include a dual active handover module/circuit 912 for performing a handover from a first access node to a second access node while maintaining two simultaneous active connections during the handover process.

The UE device 900 may also include one or more subscriber (or user) identity module(s) 918 coupled to the processing circuit 902. The subscriber identity module(s) 918 may comprise any subscriber identity module, such as a Subscriber Identification Module (SIM), a Universal Subscriber Identity Module (USIM), a CDMA Subscriber Identification Module (CSIM) or a Removable User Identification Modules (RUIM). The subscriber identity module may comprise cryptographic subscriber information contained therein, and adapted for use in subscriber authentication procedures.

The wireless communication circuit 906 may include one or more transmitters 914 and one or more receivers 916. The one or more receiver(s) 916 may be configured to allow the user equipment device 900 to maintain two or more active connections with different access nodes during a handover from a first access node to a second access node.

According to one or more features, the processing circuit 902 may be configured to perform any or all of the processes, functions, steps and/or routines related to the various UE devices described FIGS. 1-8 (e.g., UE device 102, 202, 502, 702). As used herein, the term "configured" in relation to the processing circuit 902 may refer to the processing circuit 902 being one or more of adapted, employed, implemented, or programmed to perform a particular process, function, step and/or routine according to various features described herein.

Figure 10:
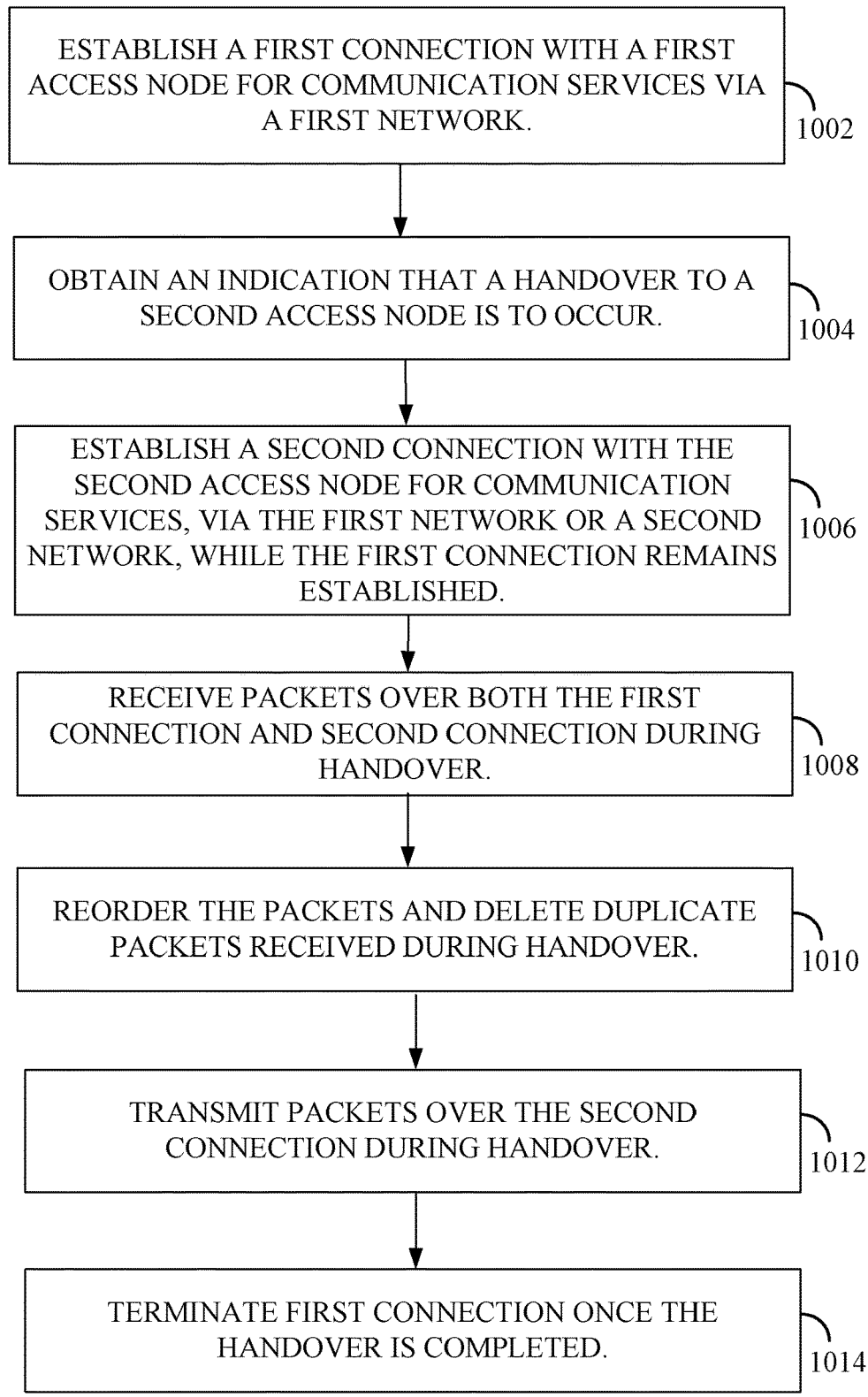
FIG. 10 is a flow diagram illustrating an example of a method operational in a UE device to facilitate a handover from a first access node to a second access node while maintaining dual active connections according to some aspects/embodiments.

FIG. 10 is a flow diagram illustrating an example of a method operational in a UE device to facilitate a handover from a first access node to a second access node while maintaining dual active connections according to some aspects/embodiments. The UE device may establish a first connection with a first access node for communication services (e.g., data services) via a first network 1002. The UE device may then ascertain or receive an indication that a handover to a second access node is to occur 1004. The UE device may establish a second connection with a second access node for communication services e.g., data services), via the first network or a second network, while the first connection remains established 1006. As part of this process, the UE device may perform authentication with an entity of the first network. During this handover, both the first connection and second connection are concurrently available, established, and/or active.

The UE device may receive packets over both the first connection and second connection during handover 1008. The UE device may reorder the packets received and delete duplicate packets received during handover 1010. For example, a packet identifier may be used to reorder and/or delete duplicates. During the handover and prior to terminating the first connection, the UE device may transmit packets over the second connection 1012.

The UE device may subsequently terminate the first connection once the handover is completed 1014. In one example, the user equipment device may ascertain or determine to terminate the first connection, e.g., once the second connection becomes fully active.In another example, the UE device may receive an indication from the first network to terminate the first connection. In some examples, determining when the handover is completed may be based on a message (or indication) received from the first or second access node. For instance, a handover completed indication may include an end marker (i.e., the last packet from the first node is sent with a flag indicating no more data). in another example, the handover completed indication may include a radio resource control (RRC) release from the first access node.

In one example, obtaining an indication that the handover should occur may include receiving a message from the first access node that the handover should occur. In another example, obtaining an indication that the handover should occur includes making an autonomous decision to initiate the handover.

In various examples, the first connection and second connection may be wireless connections over a single radio access network or over different radio access networks.

In one example, the first connection and second connection are established by sharing a single receiver at the user equipment device.

In another example, the first connection is established via a first receiver at the user equipment device and the second connection is established via a second receiver at the user equipment device.

Figure 11:
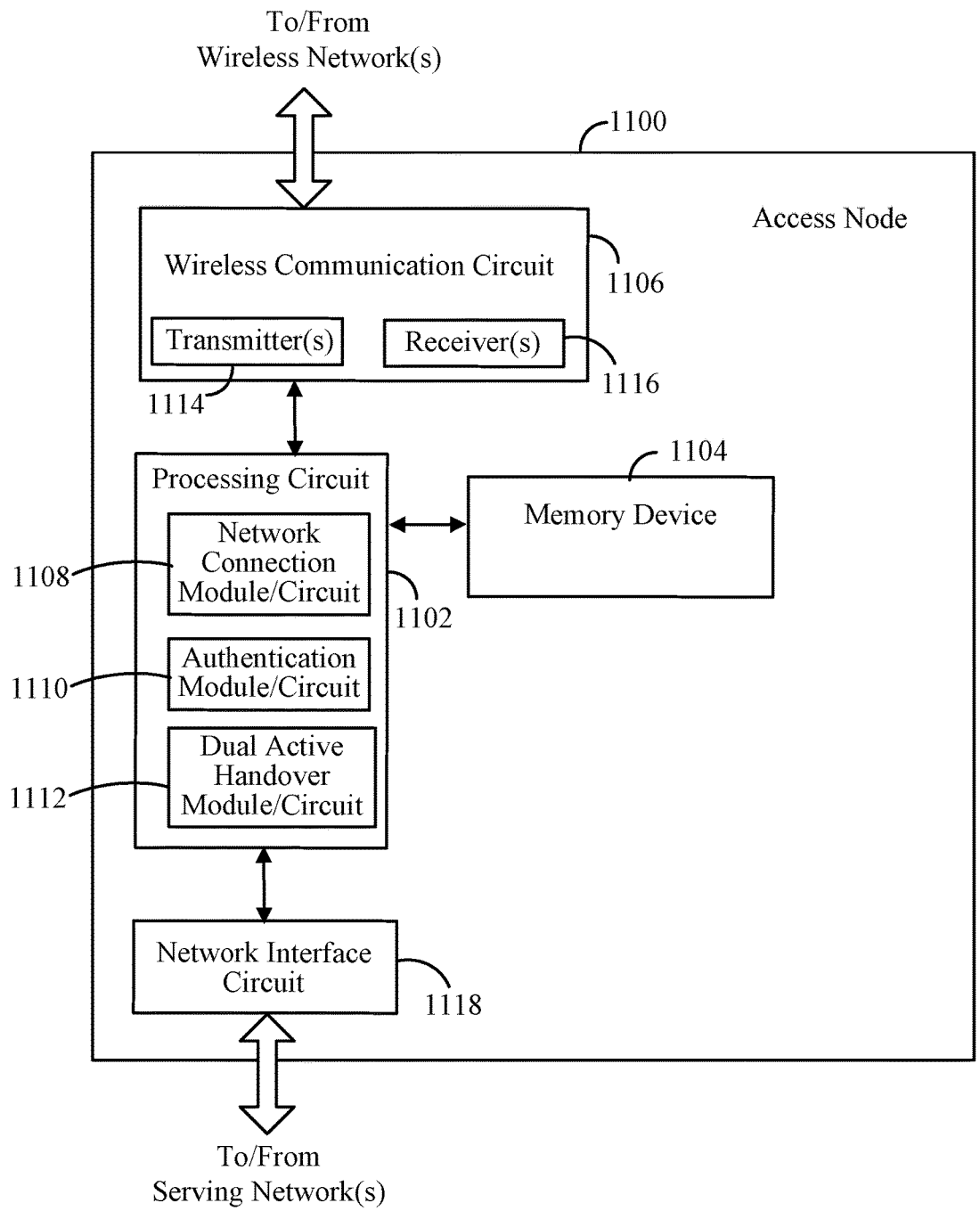
FIG. 11 illustrates a functional block diagram of at least one embodiment of an access node that facilitates dual active handovers for user equipment devices.

When establishing the second connection, a new internet protocol (IP) address may be created for the user equipment device. Alternatively, when establishing the second connection, a previous internet protocol (IP) address used by the first connect for the user equipment device may be reused.
Exemplary Access Node Device and Method Operational Therein FIG. 11 illustrates a functional block diagram of at least one embodiment of an access node 1100 that facilitates dual active handovers for user equipment devices. The access node 1100 may generally include a processing circuit 1102 (e.g., processor, processing module, etc.) coupled to a memory device 1104 (e.g., memory module, memory, etc.), a network interface circuit 1118, and/or and a wireless communication circuit 1106 according to some aspects/embodiments.

The processing circuit 1102 may be configured to establish a wireless connection to one or more user equipment devices via the wireless communication circuit 1106. The access node 1100 is configured to transmit packets between a wireless network and the network interface circuit 1118 to/from a serving network. The processing circuit 1102 may be coupled to the memory circuit 1104 such that the processing circuit 1102 can read information from, and write information to, the memory device 1104. The processing circuit 1102 may also include a network connection module/circuit 1108 for establishing a network connection (via the wireless communication circuit 1106) with one or more user equipment devices (UEs). The processing circuit 1102 may also include a device authentication module/circuit 1110 for performing the various steps of authenticating the user equipment devices with the serving network. The processing circuit 1102 may also include a dual active handover module/circuit 1112 for performing a handover of communication services for a user equipment device to another access node. For instance, if the access node 1100 maintains a first connection with a first user equipment device and decides to handover communication services for the first user equipment device to another access node, it may do so while maintaining first connection active or established until a second connection with the other access node is fully established.

the wireless communication circuit 1106 may include one or more transmitters 1114 and one or more receivers 1116.

According to one or more features, the processing circuit 1102 may be configured to perform any or all of the processes, functions, steps and/or routines related to the various access node described and/or illustrated in FIGS. 1-8 (e.g., UE device 106, 108, 203, 205, 505, 506, 704, 706). As used herein, the term "configured" in relation to the processing circuit 1102 may refer to the processing circuit 1102 being one or more of adapted, employed, implemented, or programmed to perform a particular process, function, step and/or routine according to various features described herein.

Figure 12:
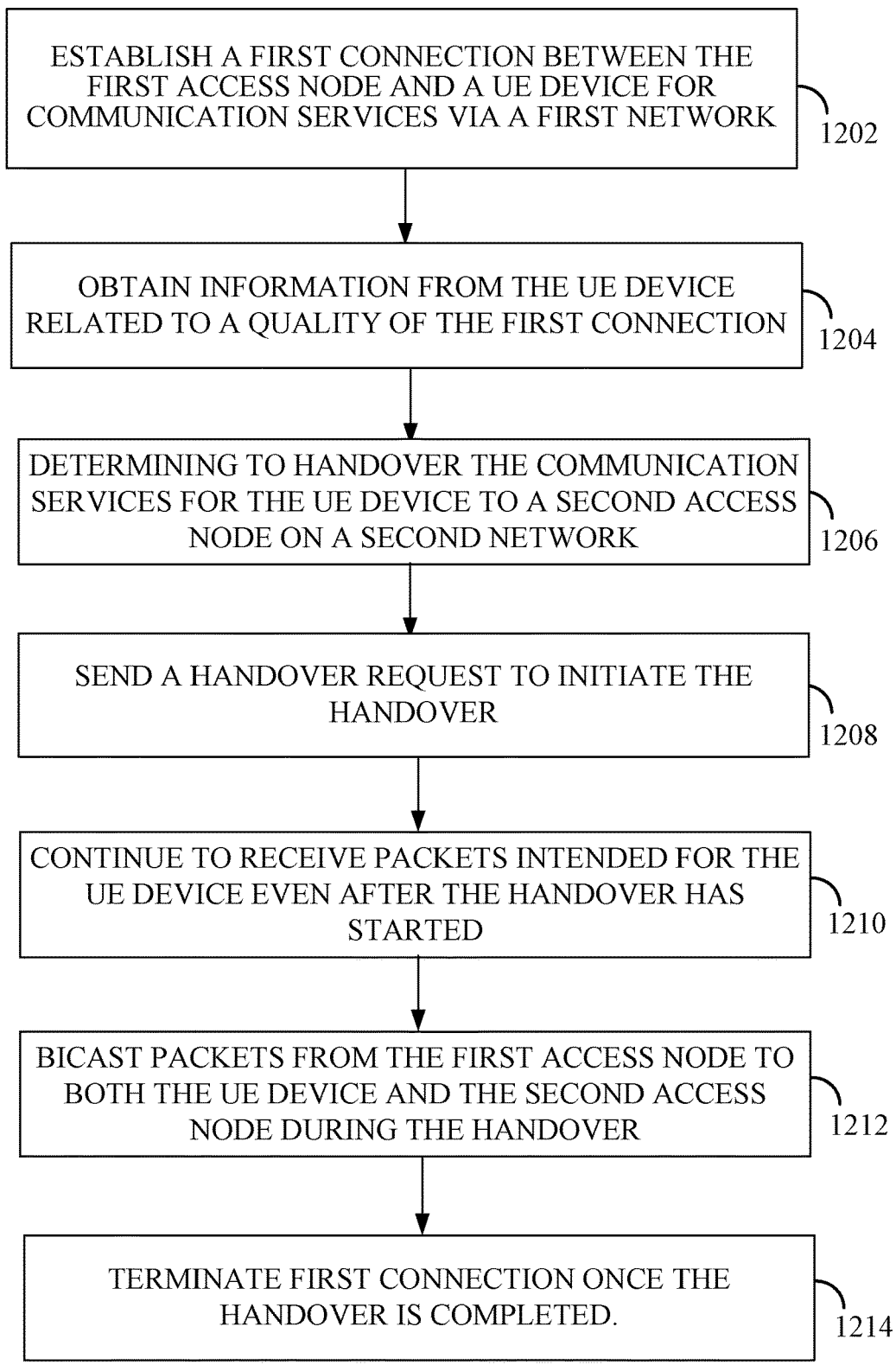
FIG. 12 illustrates a method operational at an access node for handing-off wireless services of a user equipment (UE) device to another access node using dual active connections according to some aspects/embodiments.

FIG. 12 illustrates a method operational at a first access node for handing-off wireless services of a user equipment (UE) device to another access node using dual active connections according to some aspects/embodiments. A first connection is established between the first access node and a UE device for communication services via a first network 1202. The first access node may receive/obtain information from the UE device related to a quality of the first connection 1204. The first access node may decide (or alternatively is instructed to) handover the communication services for the UE device to a second access node on a second network 1206. A handover request may then be sent by the first access node to initiate the handover 1208. For instance, the handover request may be sent to the second access node (as illustrated in FIG. 3) or to another network node (as illustrated in FIG. 4, MME 212). The first access node may continue to receive packets intended for the UE device even after the handover has started 1210. The first access node may bicast (e.g., transmitted concurrently, simultaneously, or serially) the packets to both the UE device and the second access node during the handover 1212. In an alternative implementation, rather than bicasting the packets, the first access node may forward the packets to either the UE device or the second access node. The first connection may be terminated once the handover is completed 1214.
Other Considerations One or more of the components, steps, features and/or functions illustrated in FIGS. 1, 2, 3, 4, 5, 6, 7, 8, 9, 10, 11 and/or 12 may be rearranged and/or combined into a single component, step, feature or function or embodied in several components, steps, or functions. Additional elements, components, steps, and/or functions may also be added without departing from the present disclosure.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. information, arguments, parameters, data, etc. may be passed, forwarded, or transmitted via any suitable means including memory sharing, message passing, token passing, network transmission, etc.

A processing circuit, as described herein (the processing circuit 902 and/or 1102), may comprise circuitry configured to implement desired programming provided by appropriate media in at least one embodiment. For example, a processing circuit may be implemented as one or more of a processor, a controller, a plurality of processors and/or other structure configured to execute executable instructions including, for example, software and/or firmware instructions, and/or hardware circuitry. Embodiments of a processing circuit may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit are for illustration and other suitable configurations within the scope of the present disclosure are also contemplated.

As described herein above, memory circuit, such as memory device 904 may represent one or more devices for storing programming and/or data, such as processor executable code or instructions (e.g., software, firmware), electronic data, databases, or other digital information. A memory circuit may be any available media that can be accessed by a general purpose or special purpose processor. By way of example and not limitation, memory circuit may include read-only memory (e.g., read-only memory ROM, erasable programmable ROM (EPROM), electrically erasable programmable ROM (EEPROM)), random access memory (RAM), magnetic disk storage mediums, optical storage mediums, flash memory devices, and/or other non-transitory computer-readable mediums for storing information.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different systems without departing from the disclosure. It should be noted that the foregoing embodiments are merely examples and are not to be construed as limiting the disclosure. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A method operational on a user equipment device for facilitating a dual active handover, comprising:
    establishing a first connection with a first access node for communication services via a first network;
    obtaining an indication that a handover to a second access node is to occur;
    establishing a second connection with a second access node for communication services, via the first network or a second network, while the first connection remains established; and
    terminating the first connection once the handover is completed,
    wherein the first access node and the second access node share a common serving gateway (SGW) and Packet Data Network (PDN) gateway (PGW).

2. The method of claim 1, wherein obtaining the indication that the handover is to occur includes a message or indicator from the first access node that the handover is to occur.

3. The method of claim 1, wherein obtaining receiving the indication that the handover is to occur includes making an autonomous decision by the user equipment device to initiate the handover.

4. The method of claim 1, wherein the first connection and second connection are wireless connections over a single radio access network or over different radio access networks.

5. The method of claim 1, wherein the first connection and second connection are concurrently active during the handover.

6. The method of claim 1, wherein the first connection and second connection are established by sharing a single receiver at the user equipment device.

7. The method of claim 1, wherein the first connection is established via a first receiver at the user equipment device and the second connection is established via a second receiver at the user equipment device.

8. The method of claim 1, further comprising:
    receiving packets over both the first connection and second connection during handover.

9. The method of claim 8, further comprising:
    reordering the packets received and deleting duplicate packets received during handover.

10. The method of claim 1, further comprising:
transmitting packets over the second connection during handover and prior to terminating the first connection.

11. The method of claim 1, further comprising:
creating a new internet protocol (IP) address for the user equipment device when establishing the second connection.

12. The method of claim 1, further comprising:
reusing a previous internet protocol (IP) address, used by the first connection, for the user equipment device for the second connection.

13. The method of claim 1, further comprising:
receiving a handover completed indication from the first access node or second access node.

14. The method of claim 13, wherein the handover completed indication includes at least one of:
an end marker indicating no more data to be transmitted; and
a radio resource control release from the first access node.

15. A user equipment device, comprising:
a wireless communication circuit configured to communicate with a first network; and
a processing circuit coupled to the wireless communication circuit and configured to:
establish a first connection with a first access node for communication services via the first network;
obtain an indication that a handover to a second access node is to occur;
establish a second connection with a second access node for communication services, via the first network or a second network, while the first connection remains established; and
terminate the first connection once the handover is completed,
wherein the first access node and the second access node share a common serving gateway (SGW) and Packet Data Network (PDN) gateway (PGW).

16. The user equipment device of claim 15, wherein the first connection and second connection are wireless connections over a single radio access network or over different radio access networks.

17. The user equipment device of claim 15, wherein the first connection and second connection are concurrently active during the handover.

18. The user equipment device of claim 15, wherein the processing circuit is further configured to:
transmit packets over the second connection during the handover.

19. A non-transitory machine-readable storage medium having one or more instructions stored thereon for facilitating a dual active handover, the instructions, which when executed by at least one processor, causes the at least one processor to:
establish a first connection with a first access node for communication services via a first network;
obtain an indication that a handover to a second access node is to occur;
establish a second connection with a second access node for communication services, via the first network or a second network, while the first connection remains established; and
terminate the first connection once the handover is completed,
wherein the first access node and the second access node share a common serving gateway (SGW) and Packet Data Network (PDN) gateway (PGW).

20. A method operational on a user equipment device for facilitating a dual active handover, comprising:
establishing a first connection with a first access node for communication services via a first network;
obtaining an indication that a handover to a second access node is to occur;
establishing a second connection with a second access node for communication services, via the first network or a second network, while the first connection remains established; and
terminating the first connection once the handover is completed,
wherein the first network and the second network each have a different serving gateway (SGW) and Packet Data Network (PDN) gateway (PGW).

21. A user equipment device, comprising:
a wireless communication circuit configured to communicate with a first network; and
a processing circuit coupled to the wireless communication circuit and configured to:
establish a first connection with a first access node for communication services via the first network;
obtain an indication that a handover to a second access node is to occur;
establish a second connection with a second access node for communication services, via the first network or a second network, while the first connection remains established; and
terminate the first connection once the handover is completed,
wherein the first network and the second network each have a different serving gateway (SGW) and Packet Data Network (PDN) gateway (PGW).

22. A non-transitory machine-readable storage medium having one or more instructions stored thereon for facilitating a dual active handover, the instructions, which when executed by at least one processor, causes the at least one processor to:
establish a first connection with a first access node for communication services via a first network;
obtain an indication that a handover to a second access node is to occur;
establish a second connection with a second access node for communication services, via the first network or a second network, while the first connection remains established; and
terminate the first connection once the handover is completed,
wherein the first network and the second network each have a different serving gateway (SGW) and Packet Data Network (PDN) gateway (PGW).

* * * * *

UNITED STATES PATENT AND TRADEMARK OFFICE
CERTIFICATE OF CORRECTION

PATENT NO. : 10,356,679 B2
APPLICATION NO. : 15/524141
DATED : July 16, 2019
INVENTOR(S) : Horn et al.

It is certified that error appears in the above-identified patent and that said Letters Patent is hereby corrected as shown below:

In the Claims

Column 18, Claim 2, Line 42:
The term "includes a message" is replaced with "includes receiving a message".

Column 18, Claim 3, Line 45:
The term "wherein obtaining receiving the" is replaced with "wherein obtaining the".

Signed and Sealed this
Nineteenth Day of January, 2021

Andrei Iancu
*Director of the United States Patent and Trademark Office*